United States Patent
Park et al.

(10) Patent No.: US 10,417,737 B2
(45) Date of Patent: *Sep. 17, 2019

(54) MACHINE LEARNING MODEL FOR AUTOMATIC IMAGE REGISTRATION QUALITY ASSESSMENT AND CORRECTION

(71) Applicant: International Business Machines Corporation, Armonk, NY (US)

(72) Inventors: Sun Young Park, San Diego, CA (US); Dustin M. Sargent, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,730

(22) Filed: Nov. 6, 2017

(65) Prior Publication Data

US 2018/0374194 A1 Dec. 27, 2018

Related U.S. Application Data

(63) Continuation of application No. 15/629,254, filed on Jun. 21, 2017.

(51) Int. Cl.
*G06T 3/00* (2006.01)
*G06T 7/11* (2017.01)
(Continued)

(52) U.S. Cl.
CPC .......... *G06T 3/0081* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 9,478,028 B2  10/2016  Parthasarathy et al.
2007/0081712 A1  4/2007  Huang et al.
(Continued)

OTHER PUBLICATIONS

List of IBM Patents or Patent Applications Treated as Related, Nov. 6, 2017, 2 pages.

*Primary Examiner* — Tahmina N Ansari
(74) *Attorney, Agent, or Firm* — Stephen R. Tkacs; Stephen J. Walder, Jr.; Diana R. Gerhardt

(57) ABSTRACT

A medical registration training component executing within a medical registration system performs a training medical registration operation on a pair of medical studies. Responsive to the medical registration training system determining that the training medical registration operation succeeds, the medical registration training system records a medical registration instance for the pair of medical studies in a medical registration history and marks the medical registration instance as a positive instance in the medical registration history. Responsive to the medical registration training system determining that the training medical registration operation requires correction, the medical registration training system records a medical registration instance for the pair of medical studies in the medical registration history and marks the medical registration instance as a negative instance in the medical registration history. The medical registration training system trains a failure prediction machine learning model based on the medical registration history using machine learning such that the failure prediction machine learning model predicts whether a new medical registration operation will require correction. Responsive to the failure prediction machine learning model predicting that the new medical registration operation will require correction, the mechanism takes steps to automatically correct the new medical registration operation.

9 Claims, 5 Drawing Sheets

(51) Int. Cl.
*G06T 7/00* (2017.01)
*G06T 7/35* (2017.01)

(52) U.S. Cl.
CPC ...... *G06T 7/35* (2017.01); *G06T 2207/20076* (2013.01); *G06T 2207/20081* (2013.01); *G06T 2207/30168* (2013.01)

(56) References Cited

U.S. PATENT DOCUMENTS

| | | |
|---|---|---|
| 2009/0069665 A1 | 3/2009 | Valadez et al. |
| 2011/0007959 A1 | 1/2011 | Schulz et al. |
| 2012/0283574 A1* | 11/2012 | Park .................. G06K 9/46 600/476 |
| 2013/0136322 A1 | 5/2013 | Zhan et al. |
| 2015/0199583 A1* | 7/2015 | Nagatomo ............ G06T 7/001 382/145 |
| 2016/0012592 A1* | 1/2016 | Chou .................. G06T 7/0034 382/131 |
| 2017/0178317 A1* | 6/2017 | Besley .............. G02B 21/0004 |
| 2017/0337682 A1* | 11/2017 | Liao .................... G06T 7/30 |

* cited by examiner

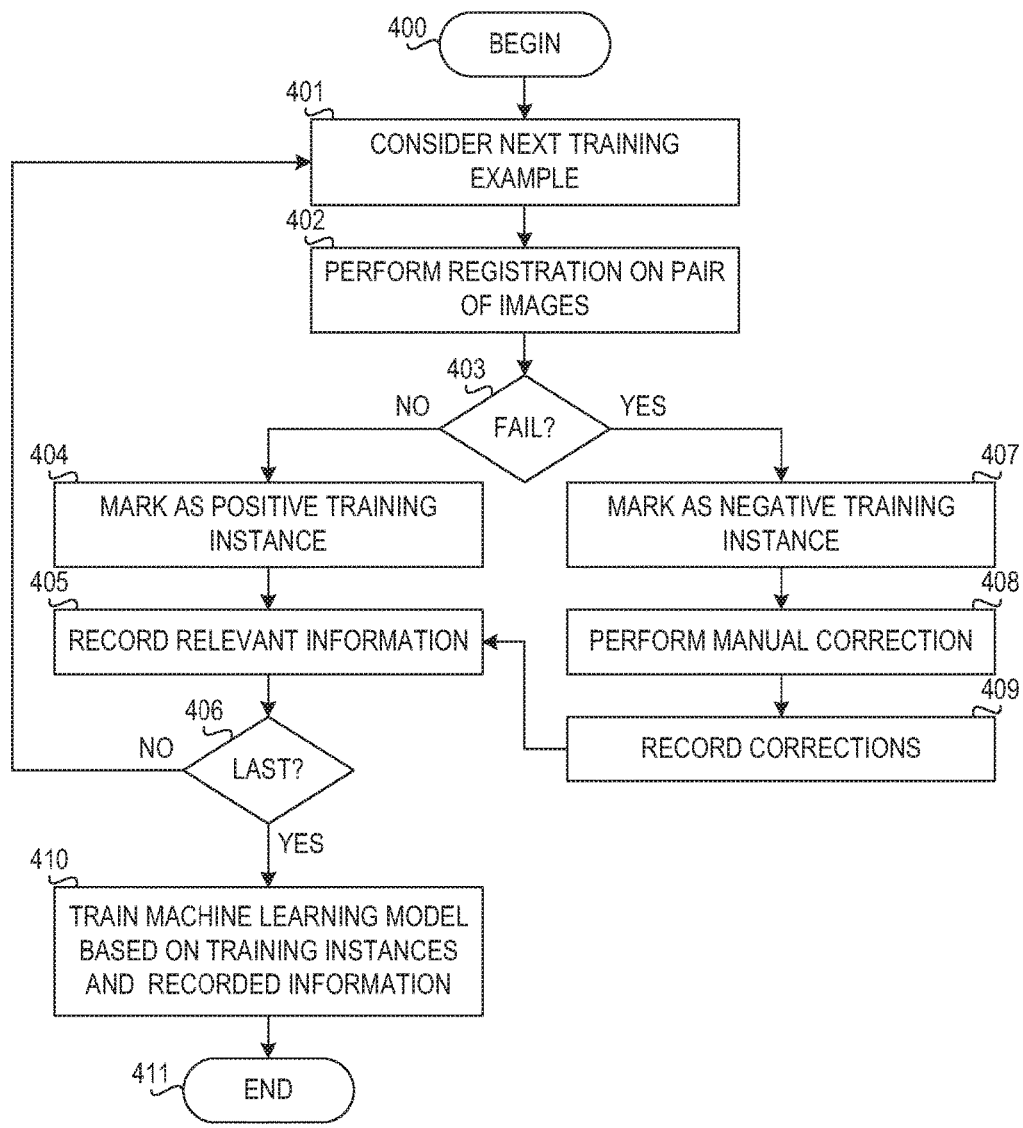

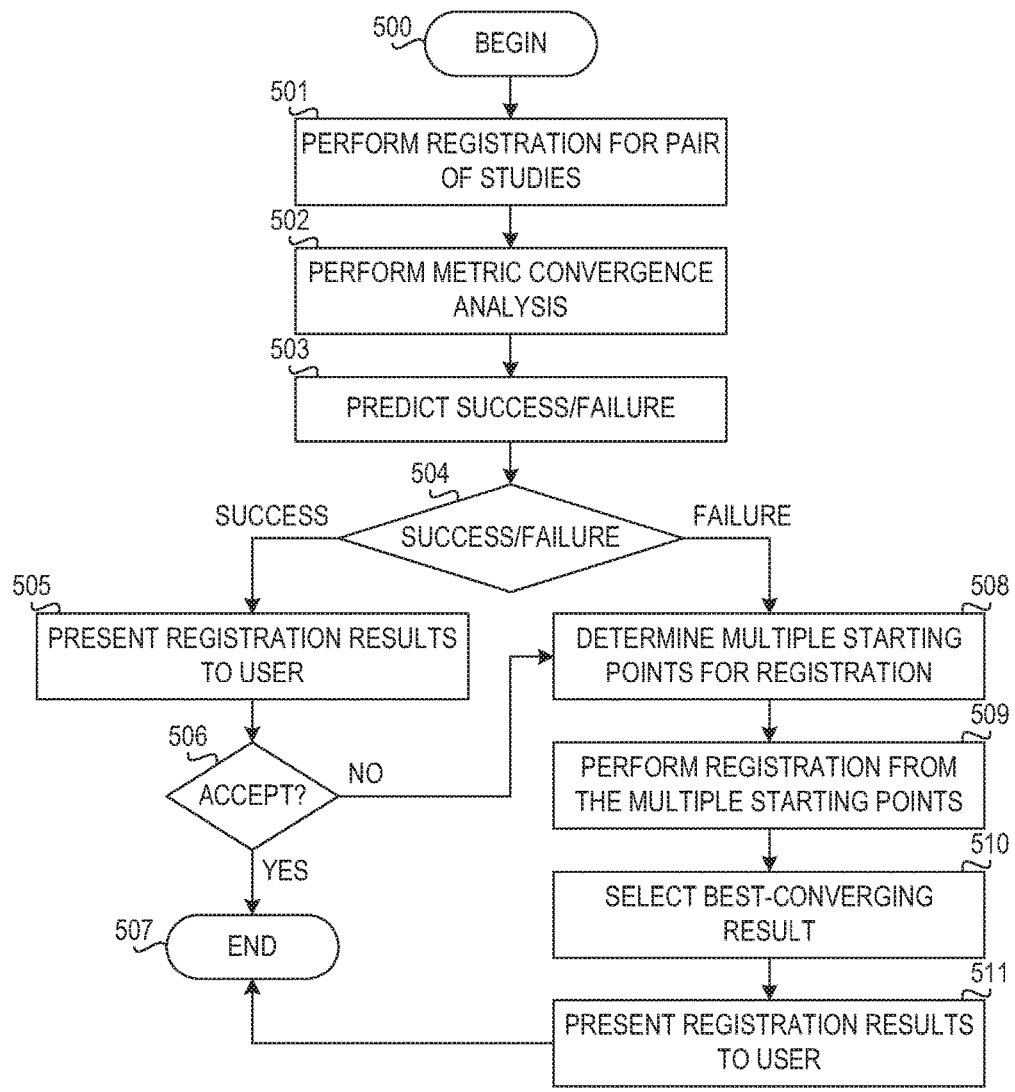

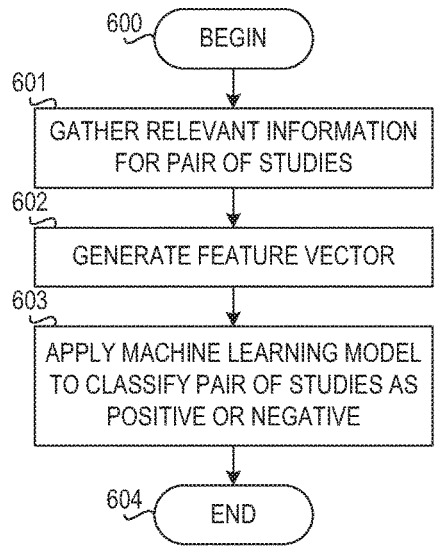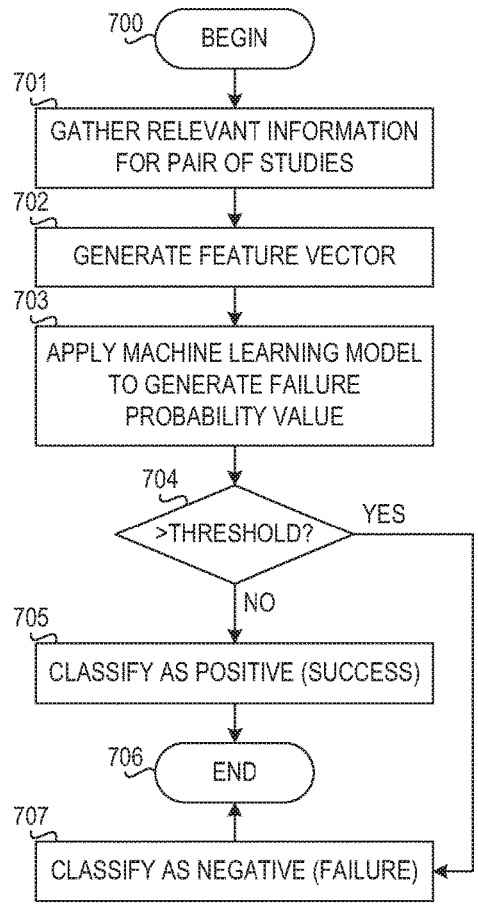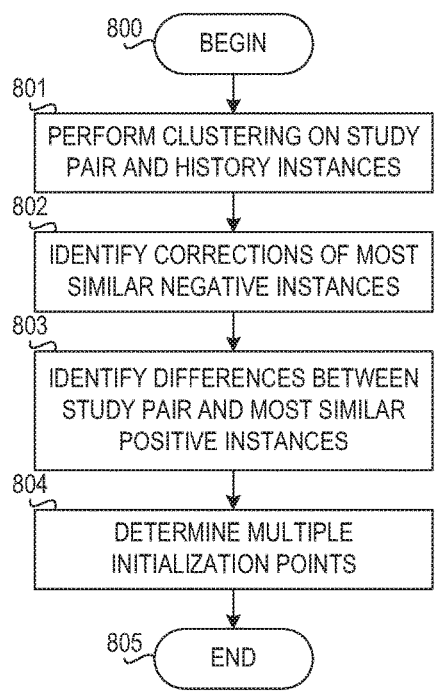

MACHINE LEARNING MODEL FOR AUTOMATIC IMAGE REGISTRATION QUALITY ASSESSMENT AND CORRECTION

BACKGROUND

The present application relates generally to an improved data processing apparatus and method and more specifically to mechanisms for automatic image registration quality assessment.

Image registration is the process of transforming different sets of data into one coordinate system. Data may be multiple photographs, data from different sensors, times, depths, or viewpoints. It is used in computer vision, medical imaging, military automatic target recognition, and compiling and analyzing images and data from satellites. Registration is necessary to compare or integrate the data obtained from these different measurements.

Image registration or image alignment algorithms can be classified into intensity-based and feature-based. One of the images is referred to as the reference or source and the others are respectively referred to as the target, sensed, or subject images. Image registration involves spatially registering the target image to align with the reference image. Intensity-based methods compare intensity patterns in images via correlation metrics, while feature-based methods find correspondence between image features such as points, lines, and contours. Intensity-based methods register entire images or sub-images. If sub-images are registered, centers of corresponding sub images are treated as corresponding feature points. Feature-based methods establish a correspondence between a number of especially distinct points in images. Knowing the correspondence between a number of points in images, feature-based methods determine a geometrical transformation to map the target image to the reference images, thereby establishing point-by-point correspondence between the reference and target images.

Image registration algorithms can also be classified according to the transformation models they use to relate the target image space to the reference image space. The first broad category of transformation models includes linear transformations, which include rotation, scaling, translation, and other affine transforms. Linear transformations are global in nature, thus, they cannot model local geometric differences between images. The second category of transformations allows "elastic" or "non-rigid" transformations. These transformations are capable of locally warping the target image to align with the reference image. Non-rigid transformations include radial basis functions (thin-plate or surface splines, multi-quadrics, and compactly-supported transformations), physical continuum models (viscous fluids), and large deformation models (diffeomorphisms).

Alternatively, many advanced methods for spatial normalization are building on structure preserving transformations homeomorphisms and diffeomorphisms since they carry smooth submanifolds smoothly during transformation. Diffeomorphisms are generated in the modern field of Computational Anatomy based on flows since diffeomorphisms are not additive, although they form a group, but a group under the law of function composition. For this reason, flows which generalize the ideas of additive groups allow for generating large deformations that preserve topology, providing 1-1 and onto transformations. Computational methods for generating such transformation are often called large deformation diffeomorphic metric mapping (LDDMM), which provide flows of diffeomorphisms as the main computational tool for connecting coordinate systems corresponding to the geodesic flows of Computational Anatomy.

Spatial methods operate in the image domain, matching intensity patterns or features in images. Some of the feature matching algorithms are outgrowths of traditional techniques for performing manual image registration, in which an operator chooses corresponding control points in images. When the number of control points exceeds the minimum required to define the appropriate transformation model, iterative algorithms like random sample consensus (RANSAC) can be used to robustly estimate the parameters of a particular transformation type (e.g., affine) for registration of the images.

Frequency-domain methods find the transformation parameters for registration of the images while working in the transform domain. Such methods work for simple transformations, such as translation, rotation, and scaling. Applying the phase correlation method to a pair of images produces a third image which contains a single peak. The location of this peak corresponds to the relative translation between the images. Unlike many spatial-domain algorithms, the phase correlation method is resilient to noise, occlusions, and other defects typical of medical or satellite images. Additionally, the phase correlation uses the fast Fourier transform to compute the cross-correlation between the two images, generally resulting in large performance gains. The method can be extended to determine rotation and scaling differences between two images by first converting the images to log-polar coordinates. Due to properties of the Fourier transform, the rotation and scaling parameters can be determined in a manner invariant to translation.

Another classification can be made between single-modality and multi-modality methods. Single-modality methods tend to register images in the same modality acquired by the same scanner/sensor type, while multi-modality registration methods tended to register images acquired by different scanner/sensor types. Multi-modality registration methods are often used in medical imaging as images of a subject are frequently obtained from different scanners. Examples include registration of brain computer tomography/medical resonance imaging (CT/MRI) images or whole body positron emission tomography/computer tomography (PET/CT) images for tumor localization, registration of contrast-enhanced CT images against non-contrast-enhanced CT images for segmentation of specific parts of the anatomy, and registration of ultrasound and CT images for prostate localization in radiotherapy.

Registration methods may be classified based on the level of automation they provide. Manual, interactive, semi-automatic, and automatic methods have been developed. Manual methods provide tools to align the images manually. Interactive methods reduce user bias by performing certain key operations automatically while still relying on the user to guide the registration. Semi-automatic methods perform more of the registration steps automatically but depend on the user to verify the correctness of a registration. Automatic methods do not allow any user interaction and perform all registration steps automatically.

Image similarities are broadly used in medical imaging. An image similarity measure quantifies the degree of similarity between intensity patterns in two images. The choice of an image similarity measure depends on the modality of the images to be registered. Common examples of image similarity measures include cross-correlation, mutual information, sum of squared intensity differences, and ratio image uniformity. Mutual information and normalized mutual information are the most popular image similarity measures for registration of multimodality images. Cross-correlation, sum of squared intensity differences, and ratio image uniformity are commonly used for registration of images in the same modality. Many new features have been derived for cost functions based on matching methods via large deformations have emerged in the field Computational Anatomy including Measure matching which are pointsets or landmarks without correspondence, Curve matching and Surface matching via mathematical currents and varifolds.

Image registration has applications in remote sensing (cartography updating), and computer vision. Due to the vast applications to which image registration can be applied, it is impossible to develop a general method that is optimized for all uses. Medical image registration (for data of the same patient taken at different points in time such as change detection or tumor monitoring or for comparing data of a patient to a reference or peer patients) often additionally involves elastic (also known as non-rigid) registration to cope with deformation of the subject (due to breathing, anatomical changes, and so forth). Non-rigid registration of medical images can also be used to register a patient's data. to an anatomical atlas, such as the Talairach atlas for neuroimaging. It is also used in astrophotography to align images taken of space. Using control points (automatically or manually entered), the computer performs transformations on one image to make major features align with a second image. Image registration is also an essential part of panoramic image creation. There are many different techniques that can be implemented in real time and run on embedded devices like cameras and camera-phones.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions that are executed by the at least one processor and configure the at least one processor to implement a medical registration system. The method comprises performing, by a medical registration training component executing within the medical registration system, a training medical registration operation on a pair of medical studies. Each medical study within the pair of medical studies comprises at least one image and information about the medical study. The training medical registration operation attempts to align the at least one image in a first medical study within the pair of medical studies with the at least one image in a second medical study within the pair of medical studies. The method further comprises, responsive to the medical registration training system determining that the training medical registration operation succeeds, recording, by the medical registration training system, a medical registration instance for the pair of medical studies in a medical registration history and marking the medical registration instance as a positive instance in the medical registration history. The medical registration history comprises a plurality of medical registration instances. The method further comprises, responsive to the medical registration training system determining that the training medical registration operation requires correction, recording, by the medical registration training system, a medical registration instance for the pair of medical studies in the medical registration history and marking the medical registration instance as a negative instance in the medical registration history. The method further comprises training, by the medical registration training system, a failure prediction machine learning model based on the medical registration history using machine learning such that the failure prediction machine learning model predicts whether a new medical registration operation will require correction. The method further comprises responsive to the failure prediction machine learning model predicting that the new medical registration operation will require correction, taking steps to automatically correct the new medical registration operation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a mechanism for training a learning engine for image registration in accordance with an illustrative embodiment;

FIG. 5 is a flowchart illustrating operation of a mechanism for image registration in accordance with an illustrative embodiment;

FIG. 6 is a flowchart illustrating operation of a mechanism for using classification to predict registration failure in accordance with an illustrative embodiment;

FIG. 7 is a flowchart illustrating operation of a mechanism for using regression analysis to predict registration failure in accordance with an illustrative embodiment; and FIG. 8 is a flowchart illustrating operation of a mechanism for using clustering to determine initialization points for re-registration in accordance with an illustrative embodiment.

DETAILED DESCRIPTION

Figure 1:
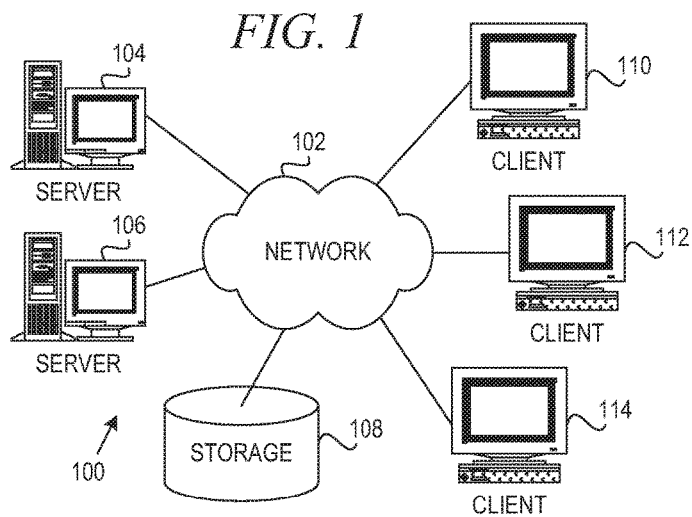
FIG. 1 is an example diagram of a distributed data processing system in which aspects of the illustrative embodiments may be implemented.

Medical image registration is a time-consuming process involving multiple large medical volumes. Batch processing and background processing are common ways to handle a registration among different medical studies. Large deformations or abnormalities make it difficult for automatic registration algorithms to provide robust results. It is difficult to predict whether the registration algorithm is successful. There is no good way to assess the quality of the registration result. Unsuccessful registration can confuse a physician or slow down work progress. One typical way to correct this problem is to use manual correction.

The illustrative embodiments provide a mechanism for automatically predicting and detecting registration failure. The mechanism of the illustrative embodiments takes multiple steps to automatically correct image registration based on learning algorithms and key organ segmentation.

A mechanism of the illustrative embodiments learns registration failure patterns from registration image histories. The registration histories may include modality, lesion size, lesion type, slice overlap, manual correction information, body part, patient demographic information, registration metric errors, etc. In accordance with one embodiment, a mechanism predicts the probability of success/failure of the registration on the current input. In another embodiment, a mechanism searches manually corrected patterns and generates different initialization points for the registration algorithm. The mechanism then attempts re-registration with alternative metrics. In one embodiment, a mechanism performs region of interest (ROI) analysis to register two volumes. A mechanism may perform symmetric registration in both directions and check for convergence to the same point. In another embodiment, a mechanism makes multiple registration attempts with different initialization. Another mechanism performs key organ segmentation and compares the location of the registered volumes.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "component," if used herein with regard to describing embodiments and features of the invention, is not intended to be limiting of any particular implementation for accomplishing and/or performing the actions, steps, processes, etc., attributable to and/or performed by the component. An component may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular component is, unless otherwise specified, for purposes of convenience of reference and not intended to be limiting to a specific implementation. Additionally, any functionality attributed to a component may be equally performed by multiple components, incorporated into and/or combined with the functionality of another component of the same or different type, or distributed across one or more components of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
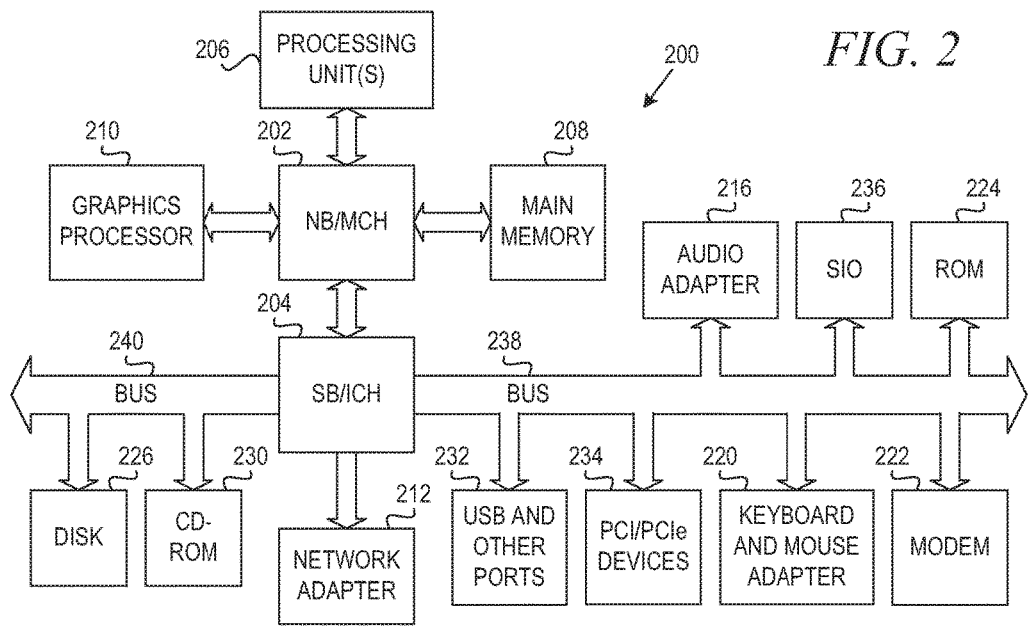
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages, Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for automatic image registration quality assessment. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates automatic image registration quality assessment.

As noted above, the mechanisms of the illustrative embodiments utilize specifically configured computing devices, or data processing systems, to perform the operations for automatic image registration quality assessment. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to a mechanism for automatic image registration quality assessment.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system tiles and/or user-generated data, for example. Essentially, data processing system 200 may be any known or later developed data processing system without architectural limitation.

Figure 3:
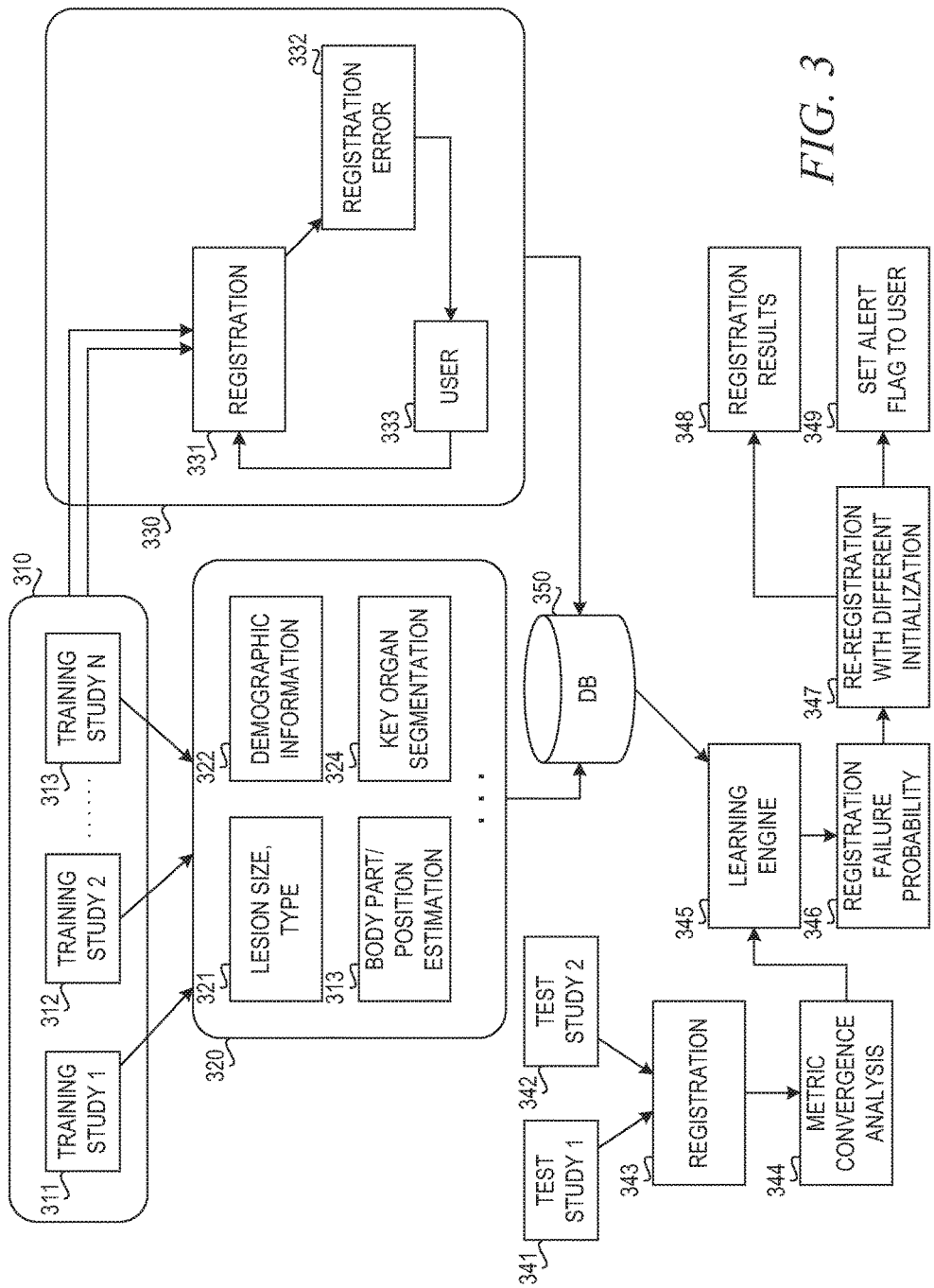
FIG. 3 is a block diagram illustrating a picture archiving and communication system with image registration, quality assessment, and correction learning in accordance with an illustrative embodiment.

FIG. 3 is a block diagram illustrating a picture archiving and communication system with image registration, quality assessment, and correction learning in accordance with an illustrative embodiment. Image registration training system 330 executes to train machine learning for a set of training studies 310, training study 1 311, training study 2, 312, . . . , training study N 313. The term "study" refers to an exam that may contain one or more image series. For example, a computer tomography (CT) chest study may contain multiple image series such as pre-contrast, post-contrast, etc., each consisting of 100 axial slices covering the top of the chest to the bottom.

A series of two-dimensional (2D) images can be combined into a three-dimensional (3D) image, which is called a "volume," Medical image registration registers two series that are represented as 3D volumes. Most of the time, the different series in a single study will not need to be registered, as they share a common digital image and communications in medicine (DICOM) frame of reference. Therefore, registering two studies means registering one of the series in training study 1 311 to a series in training study 2 312, for example. There may also be cases in which series within the same study must be registered. Because these processes are time-consuming, it is ideal for the picture archiving and communication system (PACS) to register newly received exams to prior exams using background batch processing.

Each study in the set of training studies 310 includes study information 320. In the depicted example, the study information 320 includes lesion size, type 321, demographic information 322, body part/position estimation 313, key organ segmentation 324, etc. Lesion size, type 321, demographic information 322, and the like may come from reports, DICOM structured reports, and the DICOM headers of images. Body part estimation 323 and key organ segmentation 324 may be done by separate algorithm components, which are not the focus of this disclosure. Other information included in study information 320 may include modality and slice overlap between the two series.

Image registration training system 330 performs registration on pairs of training studies from the set of training studies 310 to form a ground truth for machine learning. Machine learning is a subfield of computer science that gives computers the ability to learn without being explicitly programmed. Evolved from the study of pattern recognition and computational learning theory in artificial intelligence, machine learning explores the study and construction of algorithms that can learn from and make predictions on data—such algorithms make data driven predictions or decisions, through building a model from sample inputs. Within the field of data analytics, machine learning is a method used to devise complex models and algorithms that lend themselves to prediction. These analytical models allow researchers, data scientists, engineers, and analysts to produce reliable, repeatable decisions and results and uncover hidden insights through learning from historical relationships and trends in the data.

Image registration training system 330 includes registration component 331, which executes a registration algorithm on a pair of training studies from the set of training studies 310. The registration algorithm of registration component 331 is an iterative process that executes to convergence or for a predetermined number of iterations. If registration is successful, then registration training system 330 marks the pair of studies as positive in database 350. Other information stored in database 350 includes modality and slice overlap between the two series.

If there is a registration error 332, then user 333 performs a manual correction, which consists of the user aligning the images using some kind of user interface allowing the user to drag, rotate, etc. the two image series into alignment. In one embodiment, registration error 332 means that registration did not converge to an optimal point within a predetermined number of iterations or the user rejected the registration results. Registration training system 330 then marks the pair of studies as negative in database 330 and also stores the user correction information in database 350 in association with the pair of training studies. A training instance consists of a pair of training studies from the set of training studies 310, corresponding study information 320 of the pair of studies, a positive or negative label, registration metrics, and correction information if registration fails. Thus, database 350 stores a history of image registrations including a plurality of instances consisting of study pairs being registered. Each instance is marked as positive or negative, wherein a positive instance represents a pair of studies that was registered successfully and a negative instance represents a pair of studies for which execution of the registration algorithm failed.

For a given pair of test studies, test study 1 341 and test study 2 342, registration component 343 executes a registration algorithm to align images or series of images in test study 1 341 to images or series of images in test study 2 342. Registration component 343 outputs metrics of the registration. These metrics may include the following: mean squared difference, sum of squared differences, normalized cross correlation, mutual information, Kullback-Leibler divergence, Jensen-Shannon divergence, etc. Metric convergence analysis component 344 performs metric convergence analysis on the metrics outputted by registration component 343. Image registration is an iterative process that maximizes a metric of similarity between two series or equivalently minimizes a difference metric. Convergence means that the optimization finds a local optimum of the similarity metric. This does not always happen in practice, so the convergence may be analyzed by checking the gradient magnitude at the final point, the rate at which the similarity metric value is improving, the number of iterations required, etc.

Learning engine 345 provides machine learning for registration failure prediction component 346 and for determining different initialization points for re-registration component 347. Learning engine 345 receives input from metric convergence analysis component 344 and database 350 and applies the machine learning from learning engine 345 based on ground truth in database 350 to the inputs from testing study 1 341 and training study 2 342, as well as outputs from metric convergence analysis component 344. Operation of applying machine learning to predict registration failure, determining registration failure probability, and determining different initialization points for re-registration are described in further detail below with reference to FIGS. 6-8.

Registration failure probability component 346 determines a probability that the registration of test study 1 341 and test study 2 342 by registration component 343 has failed. In this case, failure means that the registration algorithm does not converge to an optimal point, which is not known and can only be estimated based on learning engine 345 and metric convergence analysis component 344. In one embodiment, registration failure probability component 346, with support from learning engine 345, may perform a classification algorithm to classify the pair of test studies 341, 342 into a positive category or a negative category, where the positive category includes successful registrations and the negative category includes failed registrations. Operation of performing classification to predict registration failure is described in further detail below with reference to FIG. 6.

In another example embodiment, registration failure probability component 346, with support from learning engine 345, may perform a regression analysis algorithm to generate a failure probability score. The registration failure probability component 346 may then compare the failure probability score to a threshold to determine whether failure is predicted. Operation of performing regression analysis to predict registration failure is described in further detail below with reference to FIG. 7.

If registration failure probability component 346 predicts registration failure, then re-registration component 347 performs re-registration of test study 1 341 and test study 2 342 with different initialization points for the registration algorithm and/or different metrics. In one embodiment, re-registration component 347, with support from learning engine 345, may perform a clustering algorithm to identify historical training instances of registration in database 350 that are most similar to the current test instance. Re-registration component 347 then determines different initialization points based on the identified training instances. Operation of performing clustering to determine initialization points is described in further detail below with reference to FIG. 8.

Furthermore, re-registration component 347 attempts to recover from registration failure by performing region of interest (ROI) analysis to register two volumes, performing symmetric registration in both directions and checking convergence to the same point, performing key organ segmentation and comparing the location of the registered volumes, making multiple attempts with different initializations, or a combination of the above. Re-registration component then provides registration results 348 and sets an alert flag to the user 349.

As an example, consider the case of a failed registration between, for instance, two abdominal CT series. Re-registration component may correct the registration with the following steps:

1. Perform multi-alias organ segmentation on both series;
2. Transform one set of organ labels into the space of the other using the results of the failed registration;
3. Calculate offsets between the corresponding organs in the registered series;
4. Calculate a rough update to the inter-series transformation using the organ offsets; and,
5. Re-perform registration using the updated inter-series transformation as the initial guess.

As another example, consider that a cross-modality registration is performed between abdominal CT and MR series. Based on the estimated failure probability for this combination and poor convergence/high number of iterations required for registration to terminate, registration failure probability component 346 predicts that registration failed. The negative instances in database 350 include records of the use actions typically required to correct this type of failed registration. For instance, it may be that the rotation component is correct but there is commonly a mistranslation along the superior-inferior axis. Therefore, re-registration component 347 corrects the problem by re-initializing the registration algorithm with multiple starting points varying the translation along the super-inferior axis and selects the best-converging result as the final registration.

FIG. 4 is a flowchart illustrating operation of a mechanism for training a learning engine for image registration in accordance with an illustrative embodiment. Operation begins (block 400), and the mechanism considers the next (first) training example (block 401). A training example includes a pair of training studies. A study is an exam that may contain multiple image series. A series of 2D images can be combined into a 3D image, which is called a volume. Each study also includes study information, which may include modality (e.g., computerized tomography, medical resonance imaging, X-ray, etc.), lesion size, lesion type, body part, position estimation, patient demographic information, key organ segmentation, etc. The mechanism performs an image registration algorithm on the pair of studies (block 402).

The mechanism then determines whether registration fails (block 402). In training, failure is based on user rejection of the result; however, failure may also be based on errors generated by the registration algorithm. If registration does not fail, the mechanism marks the training example as a positive instance (block 404) and records relevant information in a database (block 405). The relevant information may include the above study information, as well as metrics outputted by the registration algorithm. The mechanism determines whether the current training example is the last training example (block 406). If the current training example is not the last training example, then operation returns to block 401 to consider the next training example.

If registration fails in block 403, then the mechanism marks the current training example as a negative instance (block 407). Next, a user performs manual correction of the registration (block 408), and the mechanism records the corrections (block 409). Operation proceeds to block 405 to record the other relevant information, and the mechanism determines whether the current training example is the last training example (block 406).

If the current training example is the last training example in block 409, then the mechanism trains a machine learning model based on the training examples and recorded information (block 410). Thereafter, operation ends (block 411). As described above, the machine learning model may be a classifier, a regression analysis model, or a clustering model. In one embodiment, the machine learning model uses a classification algorithm for predicting whether registration of a test instance of a pair of studies will fail. In another example embodiment, the machine learning model uses regression analysis to generate a registration failure probability score. In another example embodiment, the machine learning model uses a clustering algorithm to determine training instances most like the current test instance.

FIG. 5 is a flowchart illustrating operation of a mechanism for image registration in accordance with an illustrative embodiment. Operation begins (block 500), and the mechanism performs registration for a pair of studies (block 501). The mechanism then performs metric convergence analysis (block 502) and predicts success/failure based on relevant information about the pair of studies and metrics outputted by the registration algorithm using a machine learning model (block 503). The mechanism determines whether the prediction is success or failure (block 504).

If the mechanism determines the prediction is success, then the mechanism presents the registration results to the user (block 505) and determines whether the user accepts the registration results (block 506). If the user accepts the registration results, then operation ends (block 507).

If the mechanism determines the prediction is failure in block 504 or the user does not accept the registration results in block 506, then the mechanism determines multiple starting points for the registration algorithm (block 508). In one embodiment, the mechanism determines the multiple starting points for the registration algorithm based on relevant information about the pair of studies and metrics outputted by the registration algorithm using a machine learning model. The mechanism then performs re-registration from the multiple starting points (block 509) and selects the best-converging result (block 510). The mechanism presents the registration results to the user (block 511), and operation ends (block 507).

FIG. 6 is a flowchart illustrating operation of a mechanism for using classification to predict registration failure in accordance with an illustrative embodiment. In machine learning and statistics, classification is the problem of identifying to which of a set of categories (sub-populations) a new observation belongs, on the basis of a training set of data containing observations (or instances) whose category membership is known, In the terminology of machine learning, classification is considered an instance of supervised learning, i.e. learning where a training set of correctly identified observations is available. The corresponding unsupervised procedure is known as clustering, and involves grouping data into categories based on some measure of inherent similarity or distance.

Often, the individual observations are analyzed into a set of quantifiable properties, known variously as explanatory variables or features. These properties may variously be categorical (e.g., "A", "B", "AB", or "O", for blood type), ordinal (e.g., "large," "medium," or "small"), integer-valued (e.g., the number of occurrences of a particular word in an email) or real-valued (e.g., a measurement of blood pressure). Other classifiers work by comparing observations to previous observations by means of a similarity or distance function. An algorithm that implements classification, especially in a concrete implementation, is known as a classifier.

Operation begins (block 600), and the mechanism gathers relevant information for a pair of studies (block 601). The mechanism generates a feature vector for the current instance of the pair of studies, relevant information for the pair of studies, and metrics outputted by the registration algorithm (block 602). The mechanism then applies a machine learning model to classify the pair of studies as a positive or negative instance based on the feature vector of the current instance (block 603). Thereafter, operation ends (block 604).

FIG. 7 is a flowchart illustrating operation of a mechanism for using regression analysis to predict registration failure in accordance with an illustrative embodiment. In statistical modeling, regression analysis is a statistical process for estimating the relationships among variables. It includes many techniques for modeling and analyzing several variables, when the focus is on the relationship between a dependent variable and one or more independent variables (or "predictors"). More specifically, regression analysis helps one understand how the typical value of the dependent variable (or "criterion variable") changes when any one of the independent variables is varied, while the other independent variables are held fixed. Most commonly, regression analysis estimates the conditional expectation of the dependent variable given the independent variables—that is, the average value of the dependent variable when the independent variables are fixed. Less commonly, the focus is on a quantile, or other location parameter of the conditional distribution of the dependent variable given the independent variables. In all cases, the estimation target is a function of the independent variables called the regression function. In regression analysis, it is also of interest to characterize the variation of the dependent variable around the regression function which can be described by a probability distribution. A related but distinct approach is necessary condition analysis (NCA), which estimates the maximum (rather than average) value of the dependent variable for a given value of the independent variable (ceiling line rather than central line) in order to identify what value of the independent variable is necessary but not sufficient for a given value of the dependent variable.

Regression analysis is widely used for prediction and forecasting, where its use has substantial overlap with the field of machine learning, as in the present case. Regression analysis is also used to understand Which among the independent variables are related to the dependent variable, and to explore the forms of these relationships. In restricted circumstances, regression analysis can be used to infer causal relationships between the independent and dependent variables.

Many techniques for carrying out regression analysis have been developed. Familiar methods such as linear regression and ordinary least squares regression are parametric, in that the regression function is defined in terms of a finite number of unknown parameters that are estimated from the data. Nonparametric regression refers to techniques that allow the regression function to lie in a specified set of functions, which may be infinite-dimensional.

The performance of regression analysis methods in practice depends on the form of the data generating process, and how it relates to the regression approach being used. Since the true form of the data-generating process is generally not known, regression analysis often depends to some extent on making assumptions about this process. These assumptions are sometimes testable if a sufficient quantity of data is available. Regression models for prediction are often useful even when the assumptions are moderately violated, although they may not perform optimally.

In a narrower sense, regression may refer specifically to the estimation of continuous response variables, as opposed to the discrete response variables used in classification. The case of a continuous output variable may be more specifically referred to as metric regression to distinguish it from related problems.

Operation begins (block 700), and the mechanism gathers relevant information for a pair of studies (block 701). The mechanism generates a feature vector fix the current instance of the pair of studies, relevant information for the pair of studies, and metrics outputted by the registration algorithm (block 702). The mechanism then applies a machine learning model to generate a failure probability value for the pair of studies based on the feature vector of the current instance (block 703). In one example embodiment, the failure probability value may be a number between 0 and 1 or between 0 and 100.

The mechanism then determines whether the failure probability value is greater than a threshold (block 704). If the failure probability value is not greater than the threshold, then the mechanism predicts that the regression did not fail and classifies the current instance as positive (success) (block 705). Thereafter, operation ends (block 706).

If the failure probability value is greater than the threshold in block 704, then the mechanism predicts that regression did fail and classifies the current instance as negative (failure) (block 707). Thereafter, operation ends (block 706).

FIG. 8 is a flowchart illustrating operation of a mechanism for using clustering to determine initialization points for re-registration in accordance with an illustrative embodiment. Cluster analysis or clustering is the task of grouping a set of objects in such a way that objects in the same group (called a cluster) are more similar in some sense or another to each other than to those in other groups (clusters). It is a main task of exploratory data mining, and a common technique for statistical data analysis, used in many fields, including machine learning, pattern recognition, image analysis, information retrieval, bioinformatics, data compression, and computer graphics.

The notion of a "cluster" cannot be precisely defined, which is one of the reasons why there are so many clustering algorithms. There is a common denominator: a group of data objects. However, different researchers employ different cluster models, and for each of these cluster models again different algorithms can be given. The notion of a cluster, as found by different algorithms, varies significantly in its properties. Understanding these cluster models is key to understanding the differences between the various algorithms. Typical cluster models include: connectivity models, centroid models, distribution models, density models, subspace models, group models, and graph-based models. A clustering is essentially a set of such clusters, usually containing all objects in the data set. Additionally, it may specify the relationship of the clusters to each other, for example, a hierarchy of clusters embedded in each other. Clusterings can be roughly distinguished as:

Hard clustering: each object belongs to a cluster or not; or,

Soft clustering (also: fuzzy clustering): each object belongs to each cluster to a certain degree (for example, a likelihood of belonging to the cluster).

Operation begins (block 800), and the mechanism performs clustering on the study pair and history instances (block 801). In so doing, the mechanism identifies clusters or groups of history instances that are most similar to the current instance based on the relevant information about the study pair, e.g., modality, lesion size, lesion type, slice overlap, body part, demographic information, registration metrics, etc. The mechanism may generate a set of relevant features for the study pair based on the above relevant information and perform the clustering operation on the set of relevant features. The mechanism then identifies manual corrections of the most similar negative training instances in the cluster (block 802). The mechanism also identifies differences between the study pair and the most similar positive instances in the cluster (block 803). The mechanism then determines multiple starting points based on the identified manual corrections and differences (block 804). Thereafter, operation ends (block 805).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions Which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions that are executed by the at least one processor and configure the at least one processor to implement a medical registration system, the method comprising:
    a medical registration training component executing within the medical registration system performing a training medical registration operation on a pair of medical studies, wherein each medical study within the pair of medical studies comprises at least one image and information about the medical study, wherein the training medical registration operation attempts to align the at least one image in a first medical study within the pair of medical studies with the at least one image in a second medical study within the pair of medical studies;
    the medical registration training system recording a medical registration instance for the pair of medical studies in a medical registration history and marking the medical registration instance as a positive instance in the medical registration history responsive to the medical registration training system determining that the training medical registration operation succeeds, wherein the medical registration history comprises plurality of medical registration instances;
    the medical registration training system recording a medical registration instance for the pair of medical studies in the medical registration history and marking the medical registration instance as a negative instance in the medical registration history responsive to the medical registration training system determining that the training medical registration operation fails to converge;
    the medical registration training system training a failure prediction machine learning model based on the medical registration history using machine learning such that the failure prediction machine learning model predicts whether a new medical registration operation will fail to converge;
    a registration component executing within the medical registration system performing the new medical registration operation and outputs metrics of the new medical registration operation;
    a metric convergence analysis component executing within the medical registration system performing metric convergence analysis on the metrics output by the registration component;
    the medical registration system applying the failure prediction machine learning model to the new medical registration operation to predict, whether the new medical registration operation will fail to converge based on results of the metric convergence analysis; and
    the medical registration system taking steps to automatically correct the new medical registration operation responsive to the failure prediction machine learning model predicting that the new automated medical registration operation will fail to converge.

2. The method of claim 1, wherein the information about the medical study includes information about a modality, a lesion size, a lesion type, a slice overlap, a body part, demographic information about the patient, disease history use of contrast agents, and imaging protocols.

3. The method of claim 1, wherein the failure prediction machine learning model comprises a classifier model, wherein predicting whether the new medical registration operation will require correction comprises:
    generating a feature vector for the new medical registration operation based on results of the medical registration operation and information about a pair of medical studies on which the new medical registration operation is being performed; and
    applying the classifier model to the feature vector to classify the new medical registration operation as a positive instance or a negative instance.

4. The method of claim 1, wherein the failure prediction machine learning model comprises a regression model, wherein predicting whether the new medical registration operation will require correction comprises:
    generating a feature vector for the new medical registration operation based on results of the medical registration operation and information about a pair of medical studies on which the new medical registration operation is being performed;
    applying the regression model to the feature vector to generate a failure probability value;
    comparing the failure probability value to a threshold;
    responsive to the failure probability value not being greater than the threshold, predicting that the new medical registration operation will not require correction; and
    responsive to the failure probability value being greater than the threshold, predicting that the new medical registration operation will require correction.

5. The method of claim 1, wherein taking steps to automatically correct the new medical registration operation comprises at least one of performing region of interest (ROI) analysis to register two volumes, performing symmetric registration in both directions and checking convergence to a same point, or performing key organ segmentation and comparing a location of registered volumes.

6. The method of claim 1, further comprising:
    the medical registration training system recording actions required to manually correct the training medical registration operation responsive to determining that the training medical registration operation requires correction; and
    the medical registration training system training a re-registration machine learning model based on the medical registration history using machine learning such that the re-registration machine learning model identifies a plurality of initialization points for the new medical registration operation.

7. The method of claim 6, further comprising:
the medical registration system applying the re-registration machine learning model to the new medical registration operation to identify a cluster of medical registration instances in the medical registration history that are similar to the new medical registration operation responsive to the failure prediction machine learning model predicting that the new medical registration operation will fail to converge and identifying actions required to correct the medical registration operation for negative instances within the cluster of medical registration instances,
wherein taking steps to automatically correct the new medical registration operation comprises determining the plurality of initialization points for the new medical registration operation based on the identified actions.

8. The method of claim 7, further comprising identifying differences between the new medical registration operation and positive instances within the cluster of medical registration instances, wherein taking steps to automatically correct the new medical registration operation comprises determining the plurality of initialization points for the new medical registration operation based on the identified differences.

9. The method of claim 1, wherein taking steps to automatically correct the new medical registration operation comprises:
determining a plurality of initialization points for the new medical registration operation;
performing re-registration of the new medical registration operation from the plurality of initialization points; and
selecting a best-converging result of the re-registration from the plurality of initialization points.

\* \* \* \* \*